(12) United States Patent
Khun-Jush et al.

(10) Patent No.: US 7,024,188 B2
(45) Date of Patent: Apr. 4, 2006

(54) WIRELESS COMMUNICATIONS SYSTEM WITH DETECTION OF FOREIGN RADIATION SOURCES

(75) Inventors: Jamshid Khun-Jush, Nuremberg (DE); Peter Schramm, Erlangen (DE); Jan Lindskog, Pixbo (SE); Stefan Rommer, Göteborg (SE); Mathias Pauli, Nuremberg (DE); Gerd Zimmermann, Eckental (DE); Fredrik Johansson, Göteborg (SE); Anders Ranheim, Göteborg (SE); Peter Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 73 days.

(21) Appl. No.: 10/489,707

(22) PCT Filed: Sep. 13, 2002

(86) PCT No.: PCT/SE02/01647

§ 371 (c)(1),
(2), (4) Date: Sep. 17, 2004

(87) PCT Pub. No.: WO03/026218

PCT Pub. Date: Mar. 27, 2003

(65) Prior Publication Data

US 2005/0054294 A1   Mar. 10, 2005

Related U.S. Application Data

(60) Provisional application No. 60/380,389, filed on May 13, 2002, provisional application No. 60/359,326, filed on Feb. 22, 2002, provisional application No. 60/356,404, filed on Feb. 11, 2002, provisional application No. 60/318,880, filed on Sep. 14, 2001.

(51) Int. Cl.
*H04Q 7/20* (2006.01)
*G01S 15/74* (2006.01)
*G01S 13/00* (2006.01)

(52) U.S. Cl. .................. 455/423; 455/432.2; 342/455; 342/18; 342/196

(58) Field of Classification Search ............. 455/426.2, 455/432, 432.2; 342/45, 196, 18, 457, 15, 342/109; 340/10.2; 343/6.8; 370/233, 234, 370/338, 329, 395.53, 395.65
See application file for complete search history.

(56) References Cited

U.S. PATENT DOCUMENTS 5,047,774 A * 9/1991 Kimber et al. ............... 342/15

(Continued)

FOREIGN PATENT DOCUMENTS

EP   0458768 A1   11/1991

(Continued)

OTHER PUBLICATIONS

Kerry et al.; "Liaison Statement on the Compatibility Between IEEE 802. 11a and Radars in the Radiolocation and Radionavigation Service in the 520-5350 MHz and 5470-5725 MHz Bands"; IEEE 802 AD Hoc Regulatory [Online], Jan. 17, 2001, pp. 1-6m XO002180310.

*Primary Examiner*—William Trost
*Assistant Examiner*—Kiet Doan
(74) *Attorney, Agent, or Firm*—Nixon & Vanderhye P.C.

(57) ABSTRACT

The invention discloses a method for use in a wireless communications system with a plurality of broadcasting nodes, comprising the step of enabling one node in the system to function as a central node in said system and letting said node enable measurements on at least one frequency in a frequency band used by the system. Said measurements are carried out to detect if said at least one frequency is being utilized by a transmitter foreign to the system. Preferably, the measurement is enabled by means of the node transmitting a message to other nodes in the system, said message being a message pre-defined within the system as a message prohibiting all nodes from transmitting during a certain interval, said message being transmitted after the system has been detected by the node to be silent during a predefined interval between frame transmissions from the nodes in the system.

15 Claims, 11 Drawing Sheets

U.S. PATENT DOCUMENTS

| | | |
|---|---|---|
| 5,737,705 A | 4/1998 | Ruppel et al. |
| 6,195,046 B1 * | 2/2001 | Gilhousen .................... 342/457 |
| 6,339,395 B1 * | 1/2002 | Hazumi et al. ............. 342/196 |
| 6,404,381 B1 * | 6/2002 | Heide et al. ................ 342/109 |
| 6,420,995 B1 * | 7/2002 | Richmond et al. ............ 342/45 |
| 6,639,541 B1 * | 10/2003 | Quintana et al. ............. 342/18 |
| 6,661,336 B1 * | 12/2003 | Atkins et al. .............. 340/10.2 |
| 6,675,012 B1 * | 1/2004 | Gray .......................... 455/423 |

FOREIGN PATENT DOCUMENTS

| | | |
|---|---|---|
| EP | 1248477 A1 | 10/2002 |
| WO | 98/59735 A1 | 12/1998 |
| WO | 00/22783 A1 | 4/2000 |
| WO | 02/071650 A1 | 9/2002 |

* cited by examiner

WIRELESS COMMUNICATIONS SYSTEM WITH DETECTION OF FOREIGN RADIATION SOURCES

This application is the U.S. national phase of international application PCT/SE02/01647 filed in English on 13 Sep. 2002, which designated the U.S. PCT/SE02/01647 claims priority to U.S. Application No. 60/318,880 filed 14 Sep. 2001, U.S. Application No. 60/356,404 filed 11 Feb. 2002, U.S. Application No. 60/359,326 filed 22 Feb. 2002 and 60/380,389 filed 13 May 2002. The entire contents of these applications are incorporated herein by reference.

TECHNICAL FIELD

Certain wireless communication systems, such as for example wireless local area networks (WLAN) operate in frequency bands which are also used by radar systems. There is thus a need for such communications systems to be able to co-exist with radar systems, and accordingly, to carry out measurements for the presence of radars which operate on the same frequency band as the communications system, in the vicinity of the communications system.

Once the presence of a radar operating on the same frequency band is detected in the vicinity of the communications system, a control node in the system can control the system to take predetermined steps.

STATE OF THE ART

The coexistence of radar systems and wireless communications system on the same frequency bands is a relatively new issue, and thus there have been relatively few attempts to solve this problem.

SUMMARY OF THE INVENTION

There is thus a need for a method by means of which a wireless communications system can detect the presence of radar signals transmitted on the frequency band which has been assigned to the communications system. The method should make it possible to initiate measurements at more or less arbitrary points in time, and should also be possible to use both in systems with a fixed infrastructure and so called ad-hoc systems.

This need is met by the present invention in that it provides a method for use in a wireless communications system with a plurality of wireless broadcasting nodes. The method comprises the step of enabling one node in the system to function as a central node in said system and letting said node enable measurements to be carried out on at least one frequency in a frequency band which has been assigned to the system.

Said measurements are carried out to detect if said at least one frequency is being utilized by a device or a system foreign to said wireless communications system.

The measurement may be conducted either by the central node itself, or by the central node requesting one or more of the other nodes to conduct said measurements, and reporting back to the central node.

Preferably, the measurement is enabled to be carried out by means of the central node transmitting a message to other nodes in the system, which message is a message predefined within the system as a message prohibiting all nodes from transmitting during a certain interval, and said message is transmitted after the system has been detected by the node to be silent during a predefined interval between transmissions from the various nodes in the system.

Alternatively, the message can be conveyed within a new information element in the periodically transmitted beacon transmissions'.

BRIEF DESCRIPTION OF THE DRAWINGS

The invention will be describe din more detail below, with reference to the appended drawings in which.

EMBODIMENTS

Figure 1:
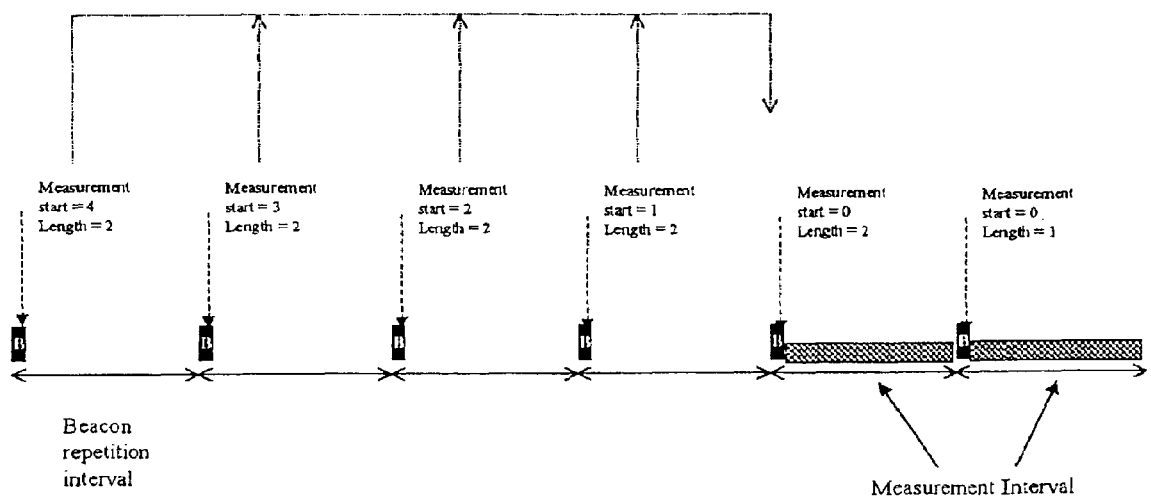
FIG. 1 shows signaling for measurements according to one aspect of the invention.

The principles of the present invention will be described below, using a wireless communications system of the radio local area network (RLAN) kind according to the so called IEEE802.11 standard. In order to illustrate the problems which are addressed by the invention, the version of this standard known as IEEE802.11a will be used, since this standard is specified for the 5 GHz band, a band which is also used by so called C-band radars.

Since the same frequency band is used both by the RLAN-system in question and certain radar systems, there is thus a need to coordinate the use of the frequency band in question. Such coordination and rules for coexistence on the same frequency band is presumably agreed upon in advance, and decided either by regulatory bodies, or by the industry itself. Regardless of which coordination functions or rules that are agreed upon, there will be a need for the RLAN system to be able to detect the presence of radars in or close to the coverage area of the RLAN system in order to apply those functions or rules, a need which is met by the present invention. Thus, this description will first focus on how an RLAN system which uses the present invention can detect transmissions from foreign systems such as, for example, radars.

In the IEEE802.11 standard, transmissions are asynchronous and coordinated using either Point Coordinating Function (PCF) or Distributed Coordination Function (DCF). Regardless of which coordination principle that is used, the system comprises a number of nodes or stations which communicate with each other. DCF is a mandatory coordination function whilst PCF is an optional coordination function. For infrastructure systems, an Access Point (AP) is a central point through which all traffic to and from the stations passes. The AP determines whether or not PCF should be used. The information is conveyed in so called Beacon messages that are sent periodically and which contain e.g. so called timestamp and data rate information.

For so called ad hoc networks, no AP exists and DCF is the only allowed coordination function. In ad hoc network all stations collectively assist in generating Beacon messages to ensure that e.g. correct timing exists among all members of the ad hoc network. For infrastructure network the present invention proposes that the AP acts as "radar controlling node" to detect foreign transmissions such as radar transmission. For ad hoc networks, one of the stations in the ad hoc network is proposed in the present invention to act as "radar controlling node". In order for the "radar controlling node" to be able to detect foreign transmissions, it needs to be able to coordinate "listening periods" throughout the system, i.e. periods during which none of the nodes in the system are allowed to transmit.

In one aspect of the present invention, the radar controlling node (RCN) is not only able to carry out the measurements itself, it can also use defined messages within the system to enable other nodes in the system to carry out radar measurements during specified intervals in time. The results of these measurements would then be transmitted to the RCN.

In the IEEE802.11-system, there has been proposed the use of so called "spoofing frames", which would be a normal 802.11 frame containing the so called network allocation vector (NAV) for the transmitting node. Generally the NAV informs the other members/nodes/stations within the system of a point in time when the current transmission, including an acknowledgement from the receiving peer node and a possible subsequent transmission and corresponding acknowledgement, is going to end. A station receiving the "spoofing frame" will update its internal NAV representation, thus prohibiting any transmission from the station until the NAV expires, which would enable radar measurements to be carried out.

According to one aspect of the invention, the measurement period during which the AP could detect the presence of radar or other foreign transmissions could be achieved by letting the AP transmit a spoofing frame, and then to carry out measurements instead of transmitting during the time interval specified in the NAV in the spoofing frame. In order to ensure that the measurement is carried out at the desired point in time, the invention proposes to give high priority within the system to such spoofing frames. This can be done in the way outlined below.

According to the standard, before the AP is allowed to transmit a spoofing frame, it must detect that the wireless media (WM) is idle for a certain predetermined time in order to ensure that no other node wants to transmit. This "quiet period" is known as DIFS (Distributed Interframe Space), and can also comprise a so called back-off time, (BO).

According to the invention, the AP transmits the spoofing frame containing the measurement data after it has detected "quiet" within the system during a period shorter than the DIFS, or shorter than DIFS+BO. Thus would give the AP the highest priority within the system for measurement periods, and accordingly would ensure that the measurements can be carried out at the desired points in time.

If an even higher priority is desired for the measurement periods, the "quiet" period necessary for the AP before it transmits the spoofing frame containing the measurement data can be shortened to the so called PIFS (PCF Interframe Space), or the SIFS (Short Interframe Space).

As an alternative to transmitting "spoofing frames" containing the desired measurement data period, the "radar controlling node", either the AP in a infrastructure BSS (Basic Service Set) system, or a node which has been appointed to act as "radar controlling node" in an ad-hoc system (or Independent BSS), can use the so called "beacon message" in the system to inform the other nodes/stations/subscribers in the system of when the measurement will start, and the duration of the measurement, and also any possible information regarding repetition intervals of the measurement periods, all of which is illustrated in FIG. 1.

The Beacon message contains fixed fields such as e.g. the Timestamp field and so called 'Information Elements' (IE:s), each of which defines a predefined set of information, e.g. Frequency hopping parameter set information. Depending on which information which is valid the beacon will contain different IE:s. When a measurement period is required the Beacon would comprise an IE which relates to a silent period used for radar measurements, with the parameters described above.

The beacon message is transmitted periodically, and thus the information regarding the start of the measurement period can be "counted down" or updated with each beacon transmission. An advantage of using the beacon message for the desired purpose is that the beacon message is transmitted repeatedly, which minimizes the risk that other nodes in the system might not receive the message properly due to, for example, radio shadow.

As an alternative to either of the two embodiments described above, the RCN can, according to the invention, carry out measurements during quiet periods which occur "on their own" in the system, i.e. without any controlling by the RCN. According to the standard, data is sent with certain legitimate frame sequences, with a certain minimum time interval between frames e.g. DIFS, and certain time interval between the protocol data units within a frame, e.g. SIFS. There is thus always a certain minimum quiet period between transmissions during which it would be possible to carry out measurements in order to detect foreign transmissions. In addition, in most systems, quiet periods which are longer than those specified should occur naturally. In this alternative, the AP could initiate measurements as soon as it detects that the system is quiet, and continue until a subscriber in the system starts to transmit.

Until now, this description has dealt with how, according to the invention, it is possible to achieve periods of time during which measurements for radar signals can be carried out by the AP in the IEEE 802.11 system. Another issue, which is also addressed by the present invention, is how the detection of radar signals as such is carried out during the "quiet periods" which have been achieved by means of the invention.

Detection of foreign signals may be based on Received Signal Strength, RSS. If the received signal reaches a certain RSS-level, it is taken notice of by the AP, and analyzed to see if it emanates from within the RLAN-system or not.

One possibility of analyzing a signal which is received during a quiet period ordered by the AP is to analyze the signal to see if it exhibits components which show that the signal belongs to a transmission source in the RLAN-system in question, in this case the IEEE 802.11 system. If such components are detected, it can be assumed that the transmission source is not a radar system. If, however, no RLAN-components are detected, it is assumed that a radar transmitter has been detected, and the appropriate specified steps are taken.

The analysis described above may include attempts to detect frame preambles inherent to frames in an 802.11-system, or even attempts to decode the signal as if it were an 802.11-signal, to see if valid data is detected.

The man skilled in the field will realize that there are many other ways of checking whether or not a signal emanates from a certain system or not, and thus, this description will not go into the details of every such detection possibility, they are all naturally within the scope of the invention.

However, one more possibility of detection of RLAN-components in a received signal will be mentioned here: the IEEE 802.11-frames contain a so called duration field, the NAV field, i.e. a field specifying the intended length of the forthcoming acknowledgement transmission from the peer station plus a subsequent transmission and its corresponding acknowledgement. Any signals detected during this period which are above the RSS-threshold can be discarded, so that only signals extending outside the duration of the frame are analyzed. Apart from the NAV field, together with the preamble, a length field is included that specifies the length of the current protocol data unit. This length field could also be used.

Returning now to the issue of measurement periods, it is naturally a desire to let the AP schedule these measurement periods at points in time when the data transmission need within the system is low, as the measurement periods will block data transmissions.

One way of scheduling the measurement periods is to let the central node, the AP, monitor its own transmit buffer status, and to also estimate the transmit buffer status of the other nodes within the RLAN-system. One way of estimating the transmit buffer status of the other nodes within the system is to let the AP sense the media for a time longer than the longest time specified between transmissions before submitting a measurement frame according to any of the methods outlined above. In the IEEE 802.11-system, this longest time would translate into the sum of the maximum interframe space (IFS) and the longest backoff (BO) time.

Naturally, if the system permits this, the AP should poll all other nodes within the system for their transmit buffer status. One way of doing this is to utilize the beacon message in the system to show that the RCN uses PCF, or if a polling function is supported by the stations/nodes/subscribers, they can be polled for pending data transmissions prior to the RCN signaling for measurement periods.

Another method could be based on counting the traffic to and from the AP during one Beacon period. If the traffic intensity is high the amount of measurement time for radar detection will be set low for the next Beacon period, and vice versa if the traffic intensity is low.

No matter which method is used to schedule the measurement periods, they should be kept as short as possible, in order to minimize transmit delays for data. A suitable value for a measurement period, given as an example only, is two milliseconds (2 ms).

It should again be stressed that the invention is equally applicable to systems which have a node appointed as AP from the beginning, as well as to systems which are so called ad-hoc systems. In such systems, also known as IBSS-systems, there is no AP that can act as central controller.

One proposal according to the inventions is to let one of the stations in the IBSS act as the "Radar Controlling Node" central controller for the purposes of scheduling and carrying out the measurements according to the inventions, as outlined above. This should be done according to a predetermined algorithm or protocol, and will transform the IBSS, for the purposes of the radar measurements, into an infrastructure based BSS, and thus, the same methods as for a system with a predetermined AP can be used.

One possible way of appointing one of the nodes to act as AP for radar measurement purposes is to assign this role to the station that initiates the IBSS.

In one aspect of the invention, it would, for example, be envisioned to let the RCN be the only node that has the capacity for "active scanning", i.e. the AP (or the node that has been assigned the role of the RCN) is the only unit that may initiate the use of the medium.

In another aspect of the invention, it would also, for example, be required for a station to determine an existing "radar controlling node" either in an ad hoc network or in an infrastructure network prior to attempting any transmissions. By detecting a RCN first, it can be assumed that the frequency used by the ad hoc network or infrastructure network is free from being used by a radar.

In order to detect radar-like interference signals with periodic signal characteristics, apart from what has been described above, it might also be desired to randomize the measurement or silencing intervals, thereby making measurement intervals non-periodic. This will increase the probability of detection of radar-like interference signals. This would be applicable to all RLAN systems, even to those who are centrally controlled like HIPERLAN/2 and HiSWANa.

One problem of introducing randomized quiet periods is that some stations belonging to a BSS (or IBSS) may fail to receive corresponding quiet control information being sent out in the Beacon message, said message having been described above. (Another solution is that stations are permitted to send only if the most recent Beacon was correctly decoded.) Hence, there is a risk that the quiet period is damaged by one of the stations within the BSS (or IBSS) as it may transmit during the quiet period.

The solution to the apparent robustness problem is to introduce redundancy, which can be done in several ways. The most straightforward method is to repeat information simply by indicating multiple quiet times in each Beacon.

Each indication would then represent quiet times for different but consecutive Beacon intervals. In order to limit the number of Quiet offset indications, the Quiet Offset fields would be cycled through over time. To simplify implementation, the list of Quiet Offset indications could be permutated clockwise one step, or every sent beacon. The quiet time is referenced to the TBTT (target beacon transmit time) time, but may also use other references such as the Beacon transmit time. Adhering to a known frame format structure, this is depicted in FIG. 2.

Figure 3:
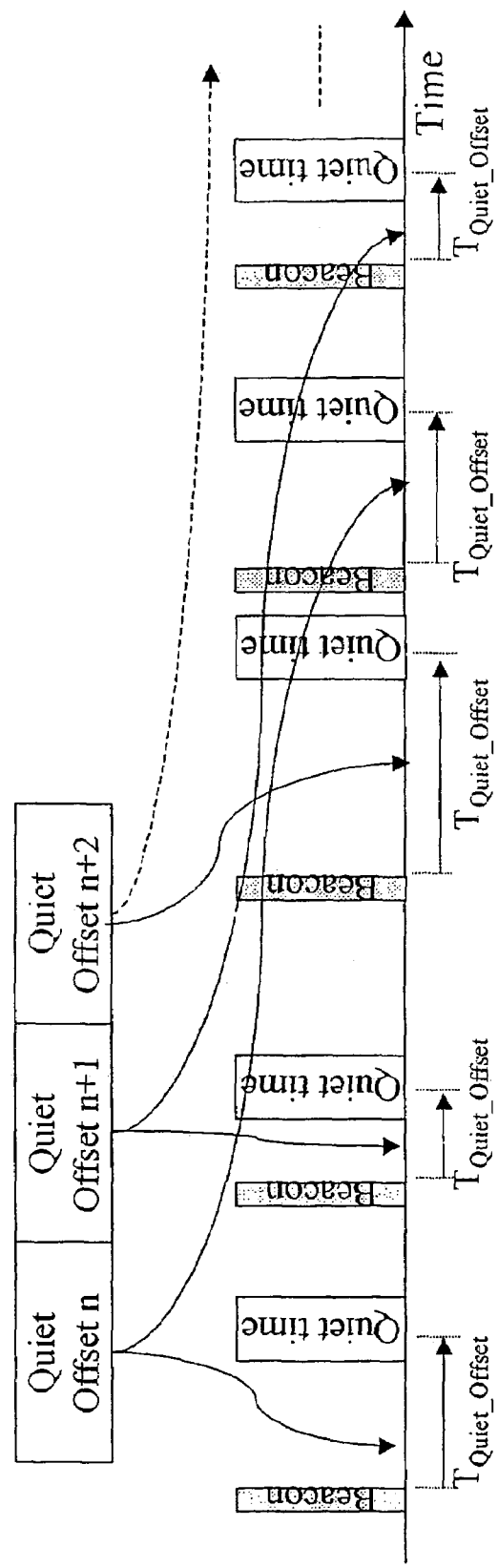

An example of the first embodiment is further depicted in FIG. 3. Here, a list of three different offsets is shown. It is further shown that a second phase of cycling through the list takes place.

Figure 2:
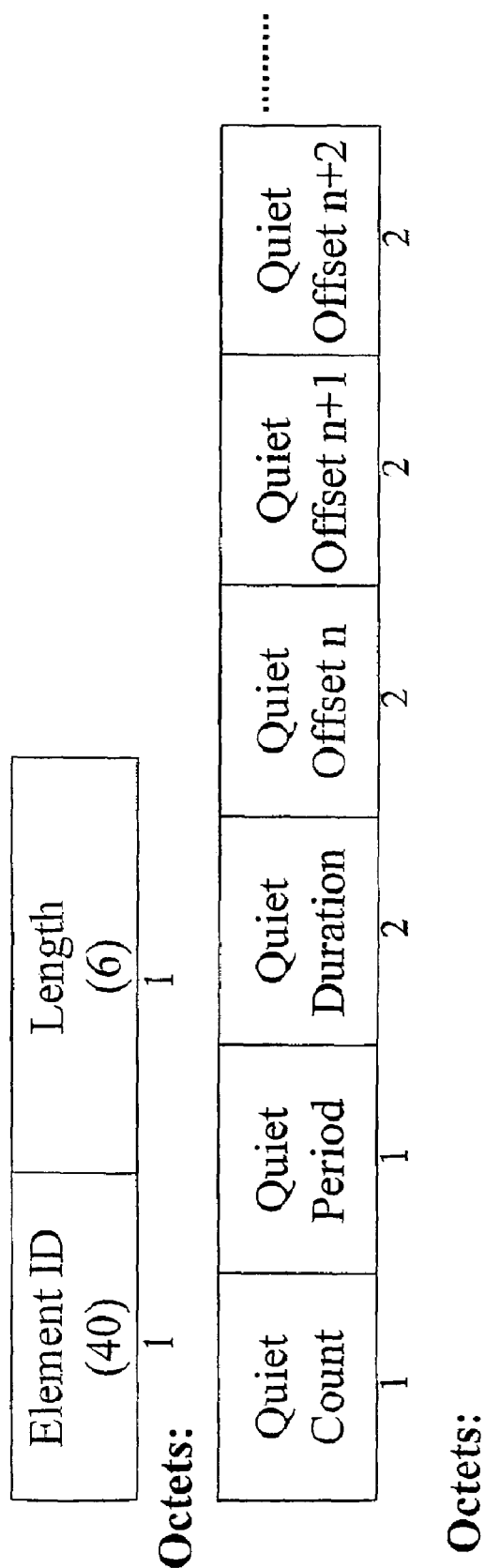
FIGS. 2 and 3 show signaling for measurements according to an alternative aspect of the invention.

One drawback with the method depicted in FIG. 2 is that multiple quiet time indications in a Beacon causes unnecessary overhead. One remedy to this inefficiency is to indicate a state for a pseudo-random generator in each Beacon. (The random generator may be implemented as a shift register with feedback. The generator polynomial should be selected such that pseudo random characteristics of the generator output is granted. A maximum length (linear) shift register may be a suitable choice.)

Each station can then synchronize their respective pseudorandom generator to the state from a correctly decoded Beacon. This state is then used when deriving the offset (i.e. the start time) for the quiet time. Note that the quiet duration must also be indicated. Here, it is assumed that the duration remains the same. The equation below describes one method of determining the offset time for the quiet period.

$$T_{Quiet\_Offset} = T_{Quiet\_Duration} \times Rem(State, floor(T_{Beacon\_Interval}/T_{Quiet\_Duration}))$$

where $T_{Offset}$ is the offset time, State is the random generator state, $T_{Duration}$ is the quiet time duration, $T_{Beacon\_Interval}$ is the interval between the Beacons and Rem is the remainder function.

Figure 4:
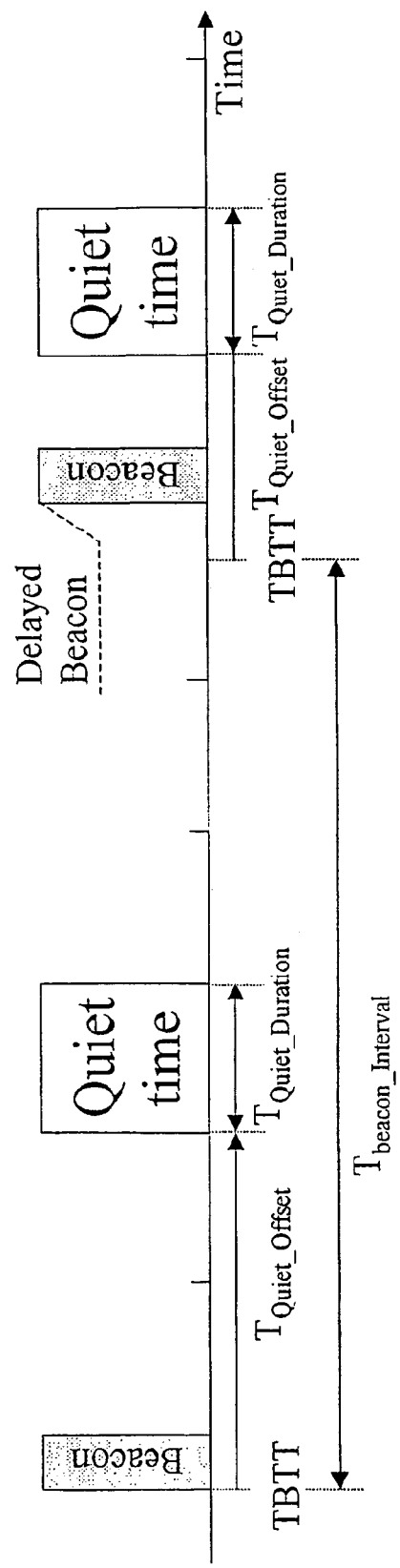
FIGS. 4 and 5 show signaling for measurements according to another alternative aspect of the invention.

This relation provides a set of non-overlapping quiet time instances distributed over the entire Beacon interval. It should be noted that other functions might equally well be applied to determine the offset time based on the random generator state as one of the inputs. The parameters in the relation above are depicted in FIG. 4.

Figure 5:
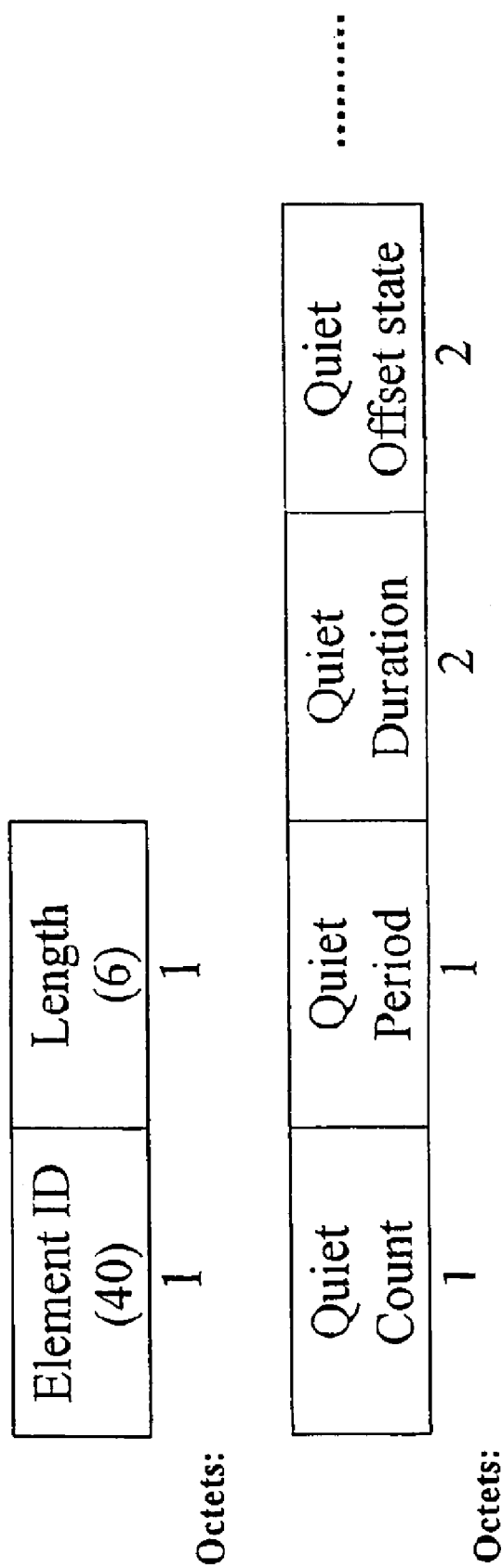

The frame format based on distributing a random generator state is depicted in FIG. 5.

Randomised quiet periods can by introduced in centrally controlled systems like HIPERLAN/2 and HiSWANa by the scheduler in the controlling node or AP. In these systems no protocol is needed.

As described above, various methods are proposed by the invention in order to differentiate between transmissions received during the measurement periods ("quiet periods"), so that radar transmissions may be detected.

A solution to this distinction has been described above capitalizing on the fact that portions (frames) of RLANs have different (longer) duration than radar pulses. In the following D_SHORTEST_RADAR and D_LONGEST_RADAR are the shortest and longest radar pulse, respectively, which can be detected by the RLAN, and D_SHORTEST_FRAME is the shortest frame of the RLAN traffic. Typical values, given as examples only, are: D_SHORTEST_RADAR ~50 ns, D_LONGEST_RADAR~20 µs and D_SHORTEST_FRAME=24 µs. Consecutive RLAN frames are separated by silent periods of variable duration, depending on the current traffic load.

If a frame with RSS>RSS_TH_1 and with duration D_I<D_SHORTEST_FRAME is detected, then radar can be assumed, and with D_I>D_LONGEST_RADAR, than a received RLAN frame is assumed.

Because the shortest radar pulses which have to be detected have a duration in the range of 50 ns, the radar detection algorithm must be also able to detect such short pulses.

Current RLANs use OFDM as modulation technique. This modulation technique is characterized by a non-constant envelope of the transmit signal with a high dynamic range (~10 . . . 12 dB), which causes a high variations of the received field strength RSS.

It is assumed that the mean received signal strength of RLAN traffic can be in the range of the radar detection power threshold RSS_TH_1. This threshold determines the power level above which the RLAN has to detect radar pulses.

This high variation of RSS makes it difficult to determine the duration D_I of an interference with RSS>RSS_TH_1 (see FIG. 6) if the RLAN traffic is received within the range of the radar detection power threshold (+−10 dB). Unfortunately, the high variation of RSS caused by the OFDM modulation technique may mislead to the detection of a train of short pulses with duration shorter than D_SHORTEST_FRAME, which may then be interpreted as radar pulses, instead of a single RLAN frame. This false radar detection may cause a high rate of frequency changes, or may even cause a longer absent time of the whole RLAN, when with proceeding detection time all channels, which the RLAN is allowed to use, are (falsely) marked as occupied by radar.

Figure 6:
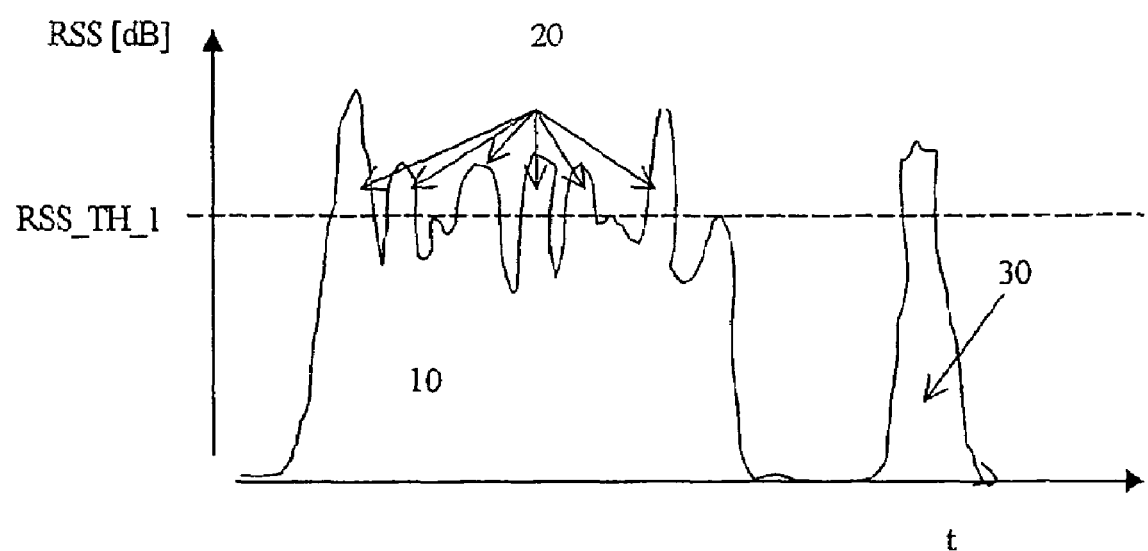
FIGS. 6–8 show measurements for foreign transmission sources according to the invention.

FIG. 6 shows an RLAN frame 10, a number of peaks 20 within this frame, which are misinterpreted as radar pulses, and also shows a true radar pulse 30.

On the other hand if the RLAN looks for periodic structures in order to identify by this characteristic a radar signal, the fluctuations of the OFDM envelope will destroy the periodic structure of a received radar signal when it is received in the range of RSS_TH_1 and therefore the radar detection probability will decrease significantly.

According to one aspect of the invention, the pulse detection is accomplished on the basis of mean values <RSS>_LONG, which is taken over a certain number of RSS-samples each of duration e.g. 50 ns. Caused by this averaging process, there remains the risk that short radar pulses in the neighbourhood of low interference are hidden and cannot be detected. Therefore, a second measuring process is accomplished in parallel by the RLAN, which uses shorter averaging periods <RSS>_SHORT. The results of both measuring processes are combined together, in order to allow a secure and reliable detection of radar pulses.

Figure 7:
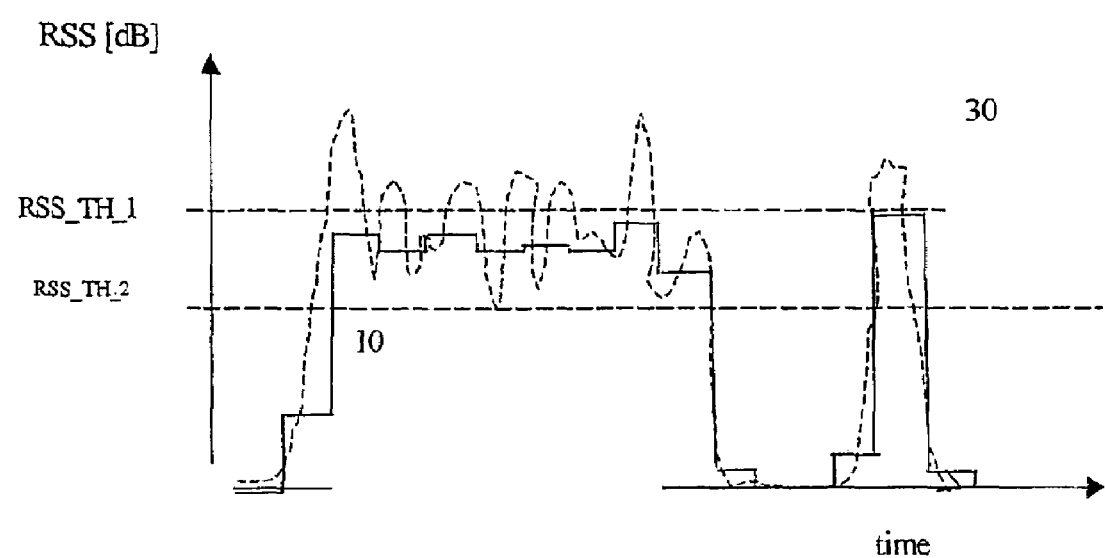

FIG. 7 shows the result for the case that the RLAN frame is received with high field strength RSS. During the reception of the RLAN frame, enough consecutive averaged RSS values <RSS>_LONG are all above the second threshold RSS_TH2, thus indicating that this signal is an RLAN frame. In FIG. 7, the outlines of FIG. 6 are shown with dotted lines, in order to highlight the difference.

A preferred embodiment is that N=11 consecutive <RSS>_LONG values exceeding the RSS_TH_2 threshold are required for the decision that it was an RLAN frame. In FIG. 7, for simplicity only 8 consecutive <RSS>_LONG values are sketched. The radar pulse is correctly detected because the RSS_SHORT value is above the threshold RSS_TH_1 and not enough <RSS>_LONG values are above RSS_TH_2.

Figure 8:
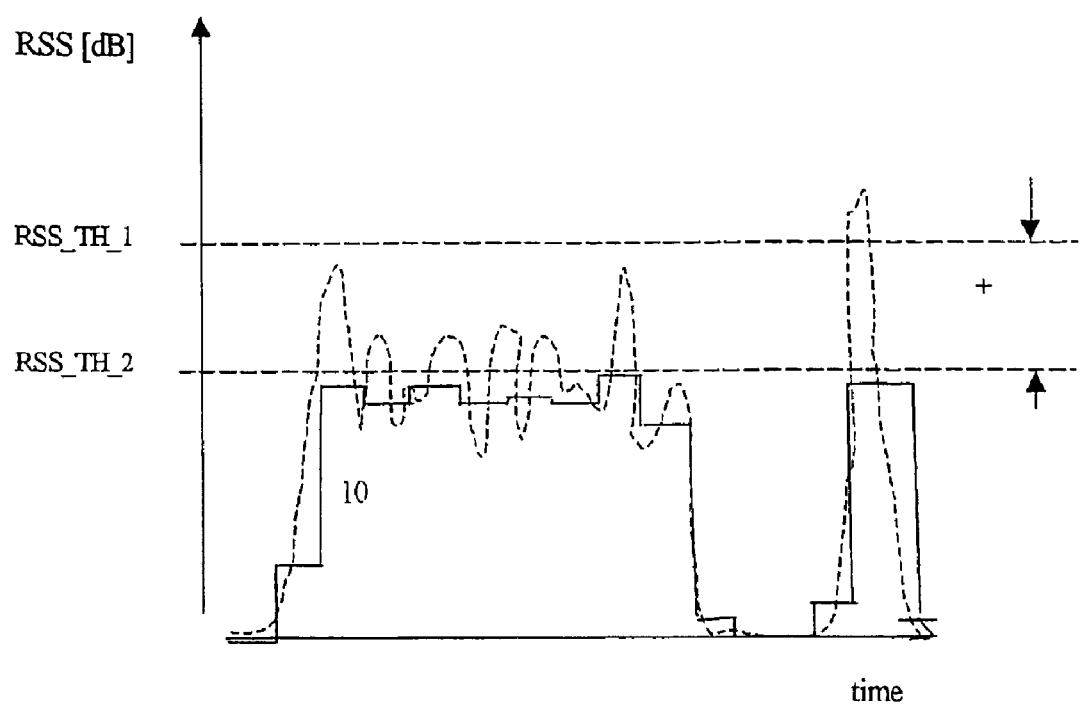

FIG. 8 shows the result, for the case that the RLAN frame is received with low field strength RSS. During the reception of the RLAN frame, all averaged RSS values <RSS>_Long are below the second threshold RSS_TH2 and no value <RSS>_SHORT is above the threshold RSS_TH_1. Therefore, no radar signal is detected during this period. This shows that the difference between the thresholds RSS_TH_1 and RSS_TH_2 must at least be equal to the dynamic range. The dynamic range is defined as the difference between the average power and the peak power of an OFDM signal, and is shown in FIG. 8 with arrows. As before the radar pulse is correctly received because the RSS_SHORT value is above the threshold RSS_TH_1.

FIG. 8 also demonstrates the dependency of the threshold RSS_TH_2 from the threshold RSS_TH_1. RSS_TH_2 must be by D+margin lower than RSS_TH_1, where D means the dynamic range of the OFDM signal and the margin means the dynamic range of the mean values <RSS>_LONG. RSS_TH_2 must be defined such that if some or no <RSS>_LONG values are below RSS_TH_2 then with a sufficient high probability no RSS_SHORT value is above RSS_TH_1 if there is only an RLAN signal present.

Figure 9:
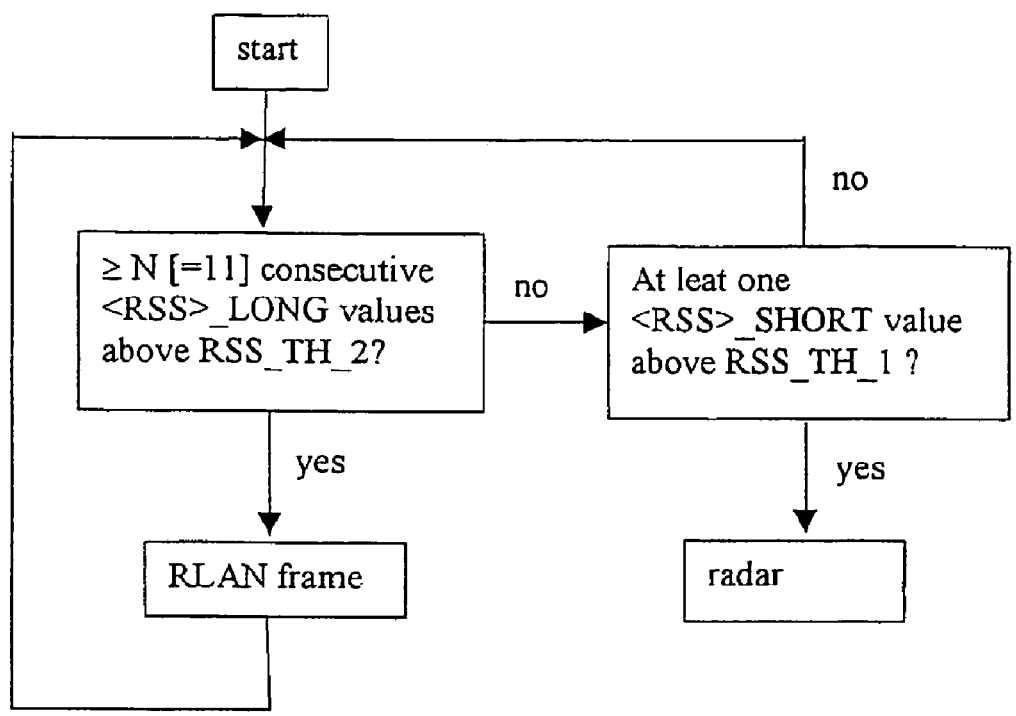
FIG. 9 shows a block diagram for detection of foreign transmission sources according to the invention.

FIG. 9 shows the block diagram for the radar detection control, where in this example it is again assumed that D_LONGEST_RADAR<11 consecutive RSS_LONG values<D_SHORTEST_FRAME.

The radar detection device has to control that enough time, where no RLAN traffic occurs (silent period), is available in order to be able to detect radar with high probability within a certain time. If too little silent time was recognized by the radar detection device, e.g. because of a high traffic load, then the radar detection device preferably has to include a so called forced silent period without any RLAN traffic. This can e.g. be accomplished by delaying own RLAN traffic. (time driven forced silent period).

Such a forced time period without RLAN traffic can not only be triggered by a certain time constraint, as mentioned in the paragraph above, but it can also be triggered by a certain event (event driven forced silent period). Such an event may be preferably an event, where the radar detection device recognizes a certain uncertainty about the radar detection decision. Then it can postpone the decision, inserts a forced silent period, accomplishes further radar measurements within this forced silent period, and decides during or after the forced silent period if radar is present or not. Such an event can e.g. be a too high number of corrupted RLAN frames within a certain time period T1. Another event can e.g. be a too high number of detected radar pulses within a certain short time T2, which seems to be untypical for radar signals.

Below, a description will be given of this aspect of the invention, on the basis of an example where <RSS>_LONG is averaged over 2 µs and <RSS>_LONG is averaged over 0.1 µs. Furthermore, it is assumed that D_SHORTEST_FRAME=24 µs and D_LONGEST_RADAR=20 µs, but of course e.g. an averaging time for <RSS>_LONG=4 µs would be a reasonable value as well.

If at least N_TH=11 consecutive values of <RSS>_LONG are all above a second threshold RSS_TH_2, then the interference is interpreted as RLAN frame. If less then N_TH=11 consecutive values of <RSS>_LONG are all above this threshold RSS_TH_2 and at least one value of <RSS>_SHORT is above the threshold RSS_TH_1, then the high interference is interpreted as radar pulse.

RSS_TH_2 is preferably lower than $RSS\_TH_{-1}$. RSS_TH_2 depends on the sensitivity level of the RLAN, on the dynamic range of the OFDM signal and on the averaging period for <RSS>_LONG. RSS_TH_2 can be the lowest level, where an RLAN signal can be successfully detected. Preferably it should be more than the dynamic range of the OFDM signal below RSS_TH_1. E.g. if RSS_TH_1=−61 dBm and the dynamic range of the OFDM signal=12 dB then RSS_TH_2 should be below −(73+margin) dBm. The margin should take care of hardware inaccuracies and variations of the mean signal power during one RLAN frame. E.g. margin ~5 dB. This should ensure that no <RSS>_SHORT value exceeds the RSS_TH_1 if less than N_TH=11 <RSS>_LONG exceeds RSS_TH_2 just due to RLAN traffic.

RSS_TH_1 depends on the averaging period of <RSS>_SHORT. E.g. if the received field signal strength radar detection threshold is −61 dBm and the detection of a 50 ns pulse is required and the <RSS>_SHORT averaging length is 100 ns than the RSS_TH_1 must be 3 dB below −6 dBm. Additionally, hardware inaccuracies shall be taken into account requiring to lower the RSS_TH_1 furthermore.

The averaging of <RSS>_LONG and <RSS>_SHORT can be accomplished over non-overlapping time periods or over a sliding window. The above example relates to non-overlapping time periods. If <RSS>_LONG is determined over a sliding window then the threshold N_TH must be increased, such that N_TH consecutive values <RSS>_LONG covers a time period T of the length

D_LONGEST_RADAR<=T<=D_SHORTEST_FRAME.

The aspect of the invention presented above is simple to implement, and allows a reliable distinction of radar pulses from RLAN frames. The detection of RLAN frames is independent of if the RLAN frame is corrupted (e.g. caused by collisions) or not. This is of significant importance, because RLAN frames can also be distinguished from radar pulses by decoding the RLAN preamble. If a preamble is detected, then the interference is identified as RLAN frame. This method of using the preamble for the decision does not work if the RLAN frame is corrupted, e.g. by a collision with another RLAN frame, which can frequently occur.

As mentioned a number of times previously, one of the problems addressed by the invention is to discover radar signals during periods where the Radar Detecting Device (RDD) does not transmit,. This process can be split into two stages; measurements and detection. Simple measurements of RSS may be satisfactorily, which puts the focus on finding efficient detection algorithms using those measurements.

Figure 10:
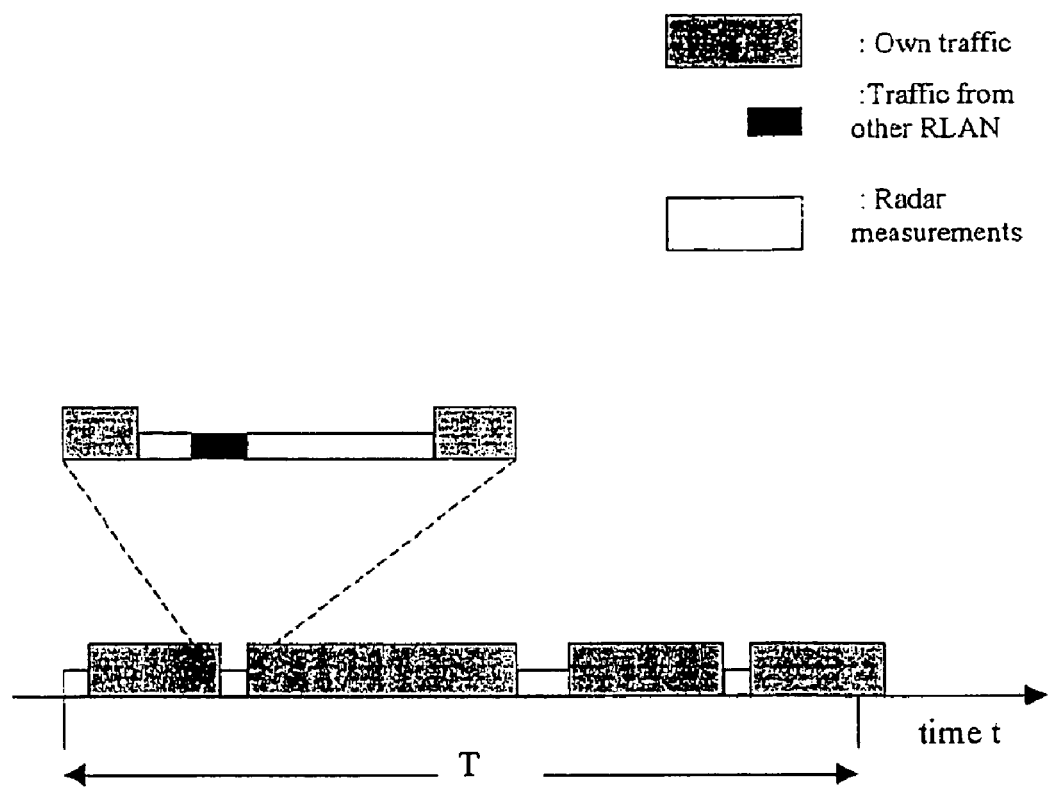
FIG. 10 shows a traffic scenario.

The requirement should be fulfilled that, generally spoken, P percent within each time interval of duration T is used by an RLAN radar detection device to scan for radar signals. During these radar measurement periods, interference from other RLANs should not cause a false alarm, i.e. the RLAN radar detection device should not assume it has detected radar although there was no radar signal present just due to the RLAN co-channel interference. At the same time the own RLAN traffic shall be impacted as little as possible. It must be remarked that own traffic is not always predictable because the RLAN has also to react on requirements coming from the distributing system (DS) or other Stations (STA). An exemplary traffic scenario is sketched in FIG. 10.

The percentage P of T can also be expressed by an absolute time T_S=T*P/100 to be measured within T.

The basic idea of this aspect of the invention also applies if the requirement for radar detection is not a specific required measurement time within a certain time interval but a performance requirement, e.g. the RLAN network or cell has to leave the frequency once a radar is present within a certain time.

The aspect of the invention which will now be described illustrates how the radar detection device (RDD) can efficiently detect radar during normal mode of operation. It is assumed that the requirement for radar detection during normal mode will be that for a certain amount of time e.g. 5% ... 20%, radar has to be measured within a certain time interval T. Another possibility for a radar detection requirement could be that the RDD has to initiate and control a frequency change or at least take care that the RLAN network or cell does not continue its operation on the used frequency within a certain time after a radar signal has become present on a certain frequency (channel). This solves the problem of how the RDD can efficiently control this required measuring time period during normal mode of operation without introducing unnecessary traffic restrictions.

The basic concept is that the device responsible for radar detection tracks the whole RLAN traffic firstly without actively controlling the traffic. At the same time the radar detection device scans for radar in time periods without traffic. This scanning is performed by RSS measurements, which are compared with the radar detection power threshold RSS_TH. If this threshold is not exceeded it can be assumed that no radar is present.

If the threshold is exceeded, the RDD checks whether this was due to RLAN traffic or not. If the RDD finds out that the exceeding was due to RLAN traffic the corresponding RLAN traffic duration is excluded from the measurement time because it cannot be guaranteed that not a radar signal above the threshold was present at the same time.

If the own RLAN traffic load is too high, or if the received RLAN traffic with RSS>RSS_TH occurs too often, so that there is a risk that the required amount of time cannot be measured within the time period T or the performance requirement cannot be fulfilled, the RDD starts to control the traffic. This control is possible by several means. By this control it can be ensured that the radar measurements are no longer disturbed by RLAN traffic and therefore enough time for mostly undisturbed radar measurements is available.

If signals above RSS_TH are received, which cannot be detected as RLAN traffic the RDD has the indication that a radar signal is present and starts to initiate and control that this frequency is no longer used.

The RDD can also start to control the traffic to suppress RLAN traffic if it notices many RSS measurements above RSS_TH although no RLAN traffic is detected. By this the RDD can ensure that it does not falsely detect radar due to non-detectable RLAN interference, caused by e.g. too many collisions. This is of course only possible if the requirement for the radar measurement time or performance requirement is still fulfilled.

In the following nine steps, the idea is exemplarily described in detail. An interfering RLAN device is here denoted RLAN_I, where the index 'I' denotes 'interfering'. It is further assumed that 'high interference' always means an interference with RSS>RSS_TH.

1. At the beginning of the time interval T the RDD uses each time interval, where the RDD does not transmit nor receive from any other RLAN device, for radar measurements.

2. The RDD counts the time T_M really used for measurements during the time interval T, i.e. where no high interference occurred.

3. High interference caused by another RLAN_I is excluded from T_M.

4. The RDD internally defines a time T_I<T, which depends on the current measurement time T_M. I.e. T_I is continuously updated. T_I is the closer to T the closer T_M to T_S is.

5. As long as T_M is smaller than T_S and the elapsed time reaches T_I, the RDD reserves the remaining time ΔT=T−T_I for the so-called forced measurement period. In this period of the forced measurements own RLAN traffic is not transmitted and the available time ΔT is used for accomplishing the rest of the required radar measurements. Within ΔT co-channel interference from other RLANs shall be suppressed (see item 7). I.e. the medium is silenced by e.g. the RDD or another device, which communicates with the RDD. This could be a device with the only task to silence the medium if told by the RDD.

6. T_I is adapted to the capability of the RDD or the device, which silences the medium so that it can accomplish the remaining time T_S−T_M of the required radar measurement time within the time interval ΔT used for forced measurements.

7. For IEEE RLANs, the suppressing of high co-channel interference from other RLANs during ΔT can be accomplished either by using the RTS/CTS mechanism of IEEE802. 11. Other embodiments to silence the medium may also be envisioned, such as letting the device which wants to silence the medium transmit short dummy pulses with preferably no information, with a period shorter than the shortest possible frame space of devices, which should kept be quite (preferably DIFS, but PIFS is also possible). Additionally, a beacon transmitted from the RDD could indicate to all associated STA:s that a period where no traffic is allowed will follow. This could be a contention free period. During this period all devices will be quite unless they are asked to transmit something. During these periods the RDD can silence the medium by simply not demanding any traffic. During these periods the radar detection could be performed. For H/2 RLANs it is not a problem to suppress such high co-channel interference from other H/2 devices belonging to the same cell by utilizing the capabilities already foreseen in the H/2 standard.

8. As soon as the real measurement time T_M is equal to or larger than the required measurement time T_S, the measurements are stopped for this time interval T, because sufficient long measurements within T have been accomplished.

9. As soon as radar is detected, the measurements are terminated and the RLAN changes frequency or at least stops the transmission on the currently used frequency The decision, if high interference is caused by radar or by another RLAN_I can be accomplished in different ways and can suitably be combined together.

It is assumed that D_SHORTEST_FRAME and D_LARGEST_FRAME is the min. and the max. length, respectively, of a RLAN frame, and that D_SHORTEST_RADAR and D_LONGEST_RADAR is the min. and the max. length, respectively, of a radar pulse to be considered.

Typical values are e.g. D_SHORTEST_FRAME≈24 μs, D_LONGEST_FRAME≈3 ms. D_SHORTEST_RADAR≈0.05 μs and D_LONGEST_RADAR≈100 μs.

The duration D_I of high interference is measured. Based on D_I it can be firstly decided if D_I can be seen as radar pulse or as RLAN interference.

In the following an example is shown of how the general idea to explore the information of the length of the interference could be implemented and to distinguish by this between RLAN traffic and radar signals.

If the duration D_I>D_LONGEST_RADAR or D_I<D_SHORTEST_RADAR, then the interference can be identified as no radar signal and therefore e.g. as RLAN interference, because such long or short radar pulses are either not possible or very unlikely. In this case it does not matter to know the originating source of the interference because is was identified as to be no radar signal.

In the other case with D_SHORTEST_RADAR≦D_I≦D_LONGEST_RADAR, then a radar pulse is possible. If further D_I is smaller than D_SHORTEST_FRAME, then radar is detected, because such short RLAN frames are not possible or very unlikely.

If D_SHORTEST_FRAME≦D_I≦D_LONGEST_RADAR either a RLAN frame or a radar pulse is possible. Then the RDD can try to detects the preamble at the beginning of the high interference. If a preamble can be detected, then the interference is identified as RLAN interference. The preamble can be a preamble from the same RLAN system or from another RLAN system (e.g. an IEEE RLAN can detect an IEEE preamble, an H/2 preamble and all preambles from known RLAN systems and vice versa, i.e. H/2 can detect H/2, IEEE and all preambles from known RLAN systems and.

In general all RLAN systems should be able to identify all preambles from al other known RLAN systems operating in the same frequency band.). If a preamble is detected, the RDD continues measuring, but excludes D_I from the current measurement time T_M. I.e. no decision to leave the frequency is dons, if this is still in line with the radar detection requirement. If no preamble can be detected it is assumed that the interference signal was a radar signal.

This fact that the typical radar pulses have a duration that is significantly shorter than the portions (frames) of data transmitted in a RLAN system could be used in another embodiment of the invention. E.g. of D_I<D_SHORTEST_FRAME than radar is assumed to be present and if D_I>D_SHORTEST_FRAME than the interference is considered to be an RLAN signal.

For all embodiments it cannot be ensured that if an RLAN signal is detected (by pulse length or by preamble detection) that no radar was hidden in this detected RLAN signal. Therefore, the decision whether this time is excluded from the measurement time, which is the preferred embodiment or whether the frequency has to be vacated anyway depends on the radar detection requirement. In any case the RDD can use the information that an RLAN signal above the power threshold RSS_TH was detected. Another possibility than excluding the time from the measurement time is to vacate this frequency (channel) but to recheck this frequency more frequently whether it is still occupied by high interference signals.

Restrictions can be added in order to lower the false detection probability, on behalf of detection sensitivity. For instance:

The maximum interference level of the pulse must be above a certain threshold.

More than one pulse must be received within a given period.

More than one pulse must be received within a given period, and they shall have a common PRF (Pulse Repetition Frequency). Note that the PRF detector can be robust regarding lost pulses.

No measurement overhead is required, and it is possible to perform radar scanning on channels that are not used. Radar scanning can be performed continuously (except during the duration of transmitted RLAN frames).

The described method of distinguishing radar from RLAN data by means of the length D_I of the received high interference and an preamble detector can be used not only during the normal mode of the RLAN but also during the start-up phase of the RLAN.

The result of detecting a radar on a specific channel, using e.g. the method described herein, has the result that the RLAN device will mark this specific channel as occupied by radar, and consequently move to a different channel, where normal operation is resumed. This could have the consequence that a significant number of channels are being marked as occupied, leaving few or no remaining channels left for the RLAN device to operate in. In such an event, the system capacity will suffer.

It is then clearly desirable to have a mechanism where the radar-marked channel is measured again; This way, it becomes possible to either (i) confirm the presence of radar on the channel, or (ii) obtain measurements which indicate that there is no longer a radar present. In the latter case, it will be allowed for the RLAN device to once again operate in the previously radar-marked channel.

In order to have a sufficiently high probability of detecting the presence of radar on such a marked frequency, it will be required to collect measurements over long time-intervals, orders of magnitude longer than the measurement periods typically used for radar detection in the normal mode, as described previously. A typical value would be that it is required to measure for a total time of $T_{TOT}$=10 s. If no radar signal was seen during this entire period, the channel can—once again—be considered as radar-free. Such long measurement intervals are highly undesirable, as it requires the RLAN device to leave its normal operating mode and thereby adversely affecting the normal operation of the device to a high degree.

As an alternative to scheduling such long measurement intervals, one can instead use the approach described in what follows.

The RLAN device will regularly schedule short measurement periods on its current operating channel, as well as on other channels. Such measurement periods are a part of the normal operation of the RLAN device, and the purpose is to always use the channel with the best characteristics (i.e. the least level of interference). The idea is then to also carry out such measurements on channels previously marked as radar-occupied, and to keep track of the total measurement time. The total measurement time is defined as the sum of all short measurement-intervals on the specific channel. For the following discussion, each (short) measurement interval is referred to with the variable $T_{meas}$, while the total measurement time is referred to with the variable $T_{TOT}$. The variable $T_{TOT}$ is initially set to a value of zero once radar has been detected on a specific channel. Each time a channel previously marked as radar-occupied is measured, one of two things can occur;

Radar is detected during the measurement interval. In this case, the channel will keep its "radar-tag". The value of $T_{TOT}$ will remain zero, or no radar signal was detected during the measurement interval. In the latter case, the total measurement time is increased in a cumulative manner, as $T_{TOT}=T_{TOT}+T_{meas}$.

The effect of this scheme is that the total cumulative measurement time on each specific channel is kept track of. In the event that sufficiently many measurements have been carried out on the radar-marked channel, so that $T_{TOT}$ satisfies the given requirement on total measurement time (e.g. 10 s used in this example), the previously radar-marked channel can once again be considered as radar-free. Furthermore, in the event that radar is detected after a number of radar-free measurements, the cumulative total time $T_{TOT}$ will once again be set to its initial value of zero. Using the method described, it will be possible to assure the presence or absence of radar on a previously marked channel with a sufficiently high level of probability, and that this is achieved without the adverse affect of long continuous measurement intervals.

make channels available for use by the RLAN, that would otherwise be unavailable, thereby improving system capacity.

A possible technical solution is described in the following.

At the beginning of each time interval of length T, the counters C0, C1 and C2 are reset to zero. The counter unit is comparable to the time, e.g. measured in ns. C0 is a counter for the total elapsed time during T.

The counter C0 counts the elapsed time within the time interval T (from zero to T).

The counter C1 counts the time already used for radar measurements (equivalent to T_M), i.e. the counter C1 is set active when any measurement interval starts and C1 stops counting when either the RLAN starts transmission or receiving a high interference signal with RSS>RSS_TH, or if the required amount C1==T_S of measurement time during T is reached.

The counter C2 is optional and counts the duration of uninterrupted high interference. If D_SHORTEST_RADAR≦C2≦D_SHORTEST_FRAME, then radar is detected. If D_LONGEST_RADAR<C2, then RLAN interference is detected, the counter C1 is set to active again after the end of the high interference and the measurement continues. If D_SHORTEST_RADAR≦C2≦D_LONGEST_RADAR, then the RLAN tries to detect the preamble within the high interference. If the preamble cannot be found then radar is detected. Otherwise the counter C1 is set to active again after the end of the high interference and the measurements continue.

It is assumed that the RDD is capable to accomplish forced measurement ('forced' means the RDD or another device suppresses own transmissions and transmissions of neighboring RLAN devices using the same frequency as RDD) in X percent of the time interval of duration ΔT. Then a time threshold T_I is set, e.g. T_I=(T−T_S−T_M)*100/X.

Figure 11:
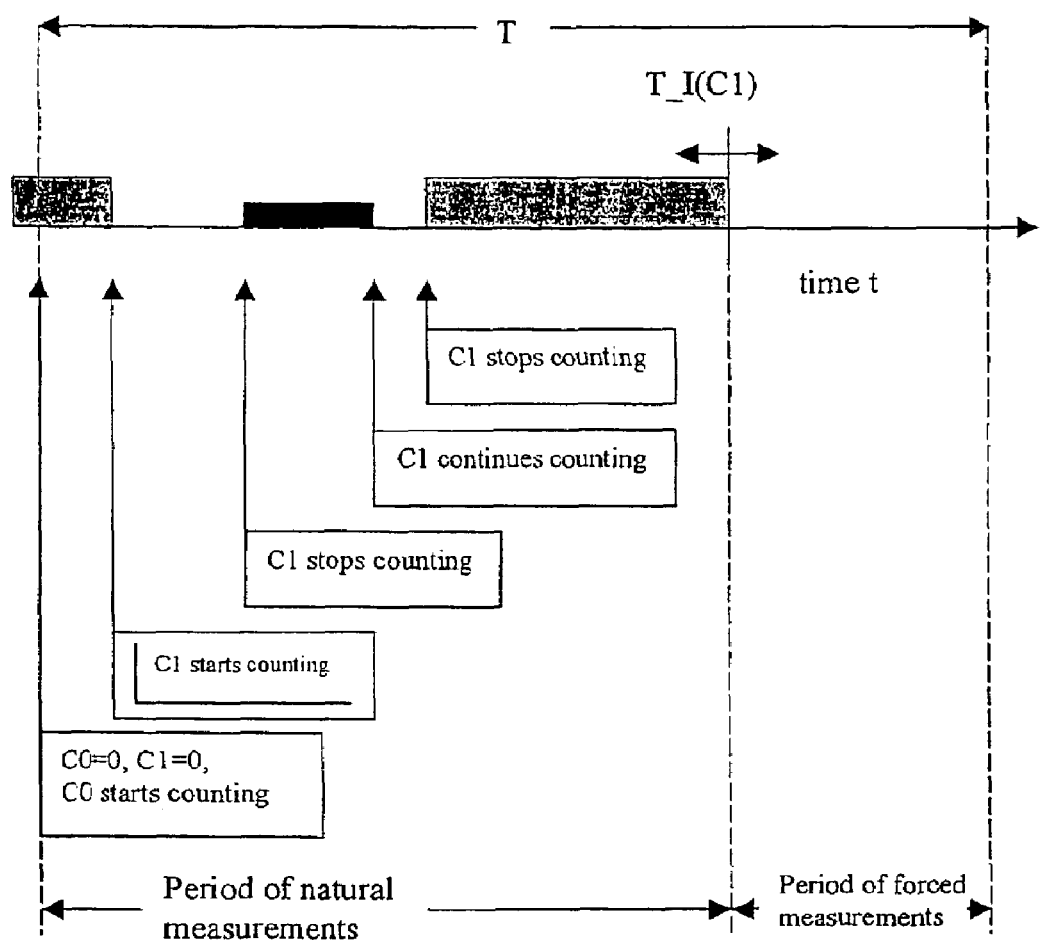
FIG. 11 shows timing for required measurements in one aspect of the invention.

T_I defines the time, which is necessary to accomplish the remaining required measurement time T_S−T_M, see also FIG. 11.

Whenever C0=T_I, then the forced measurements starts in order to ensure that within T, measurements of total duration of at least T_S are accomplished as required.

The forced measurements for IEEE802.11 systems can be accomplished by the following method: The RDD announces a transmission to preferably a dummy STA using the RTS/CTS method. The RTS-frame (and the CTS-frame) contains information about the required duration for the transmission. By this method all neighboring RLAN devices are informed about the time and the duration of the next transmission, and all RLAN devices will be silent during this announced transmission.

Contrary to the usual and specified method, preferably no CTS need to be sent back to the RDD (because the target was preferably 'only' a dummy STA). The RTS could also be sent to a real STA, which then responses with a CTS frame. But for the current invention it is only necessary to silence the STA, which are in the communication range to the RDD. I.e. no hidden station problem exists. The RDD announces sufficient time in the RTS command, which is necessary for the rest of the radar measurements. If the required measurement time T_S−T_M is longer than the max. time allowed for a continuous transmission, then the RDD has to partition the rest of the measurement time and has to use several RTS transmissions as close together than possible.

During the time reserved by the RDD for a transmission, the RDD does not transmit but will only measure. Therefore, this measurement is not disturbed by other RLAN devices (with some rare exceptions that an RLAN device has not received the RTS). Because the RTS transmission request has to use the standardized competition period within DCF, the access on the transmission channel may be delayed if the traffic load in the neighborhood is high. Therefore, the time T_I can only roughly assessed. It is therefore proposed to give an RLAN device, which has to detect radar, a higher priority during the competition period than other RLAN devices. It is further proposed to control this priority by the definition of a new inter frame space RIFS (Radar Inter Frame Space). RIFS shall be shorter than DIFS, but larger than SIFS. Possibly it is equal to PIFS. I.e. SIFS<RIFS<=PIFS<DIFS. In this case no additional frame space has to be specified, only that the RDD or another device, which silences the medium is allowed to us PIFS to get access to the medium, has to be specified.

The invention is not limited to the embodiments described above, but can be varied freely within the scope of the appended claims. It is for example entirely within the scope of the invention to apply the inventive principles to a system other than the IEEE 802.11, or to later generations of the IEEE 802.11 system.

What is claimed is:

1. A method for use in a wireless LAN-system of the 802.11-type for avoiding interference between radar signals and the signals exchanged between a plurality of wireless broadcasting nodes in the system, the method comprising the steps of:

enabling one of the nodes in the system to function as a radar controlling node (RCN) and letting said RCN carry out measurement on at least one frequency in a frequency band which has been assigned to the system, said measurements being carried out to detect if said at least one frequency is being utilized by a device or a system foreign to said wireless communications system, such as a radar device or system, the measurement being enabled to be carried out by means of the RCN transmitting a "quiet" message to other nodes in the system, said "quiet" message being a message which prohibits other nodes from transmitting during a certain interval defined in the "quiet" message, which method is characterized in that:

said "quiet" message is contained in the beacon message of the 802.11-system, as an Information Element (IE) in the Beacon message, the "quiet" message which is transmitted contains information about the start of said interval, as well as the duration of the interval, the "quiet" message is transmitted redundantly in each Beacon message by the RCN.

2. The method of claim 1, according to which the redundancy is achieved by means of each "quiet" message within a Beacon message containing indications of multiple "quiet" intervals for different but consecutive Beacon intervals.

3. The method of claim 2, according to which the redundancy is further enhanced by cycling fields with information about "quiet" intervals within the Beacon message over time.

4. The method of claim 1, according to which "quiet" intervals are indicated by indicating a state for a pseudo-random generator in each Beacon message, each station then synchronizing respective pseudorandom generators to said state in order to derive the start of the "quiet" intervals, the duration also being indicated in the Beacon or agreed upon previously.

5. The method of claim 4, according to which the start of the "quiet" interval is determined by the equation:

$$T_{Quiet\_Offset} = T_{Quiet\_Duration} \times \text{Rem}(\text{State}, \text{floor}(T_{Beacon\_Interval}/T_{Quiet\_Duration}))$$

where $T_{Offset}$ is the offset time, State is the random generator state, $T_{Duration}$ is the quiet time duration, $T_{Beacon\_Interval}$ is the interval between the Beacons and Rem is the remainder function.

6. A method for use in a wireless LAN-system of the 802.11-type for avoiding interference between radar signals and the signals exchanged between a plurality of wireless broadcasting nodes in the system, the method comprising the steps of:

enabling one of the nodes in the system to function as a radar controlling node (RCN) and letting said RCN carry out measurement on at least one frequency in a frequency band which has been assigned to the system, said measurements being carried out to detect if said at least one frequency is being utilized by a device or a system foreign to said wireless communications system, such as a radar device or system, the measurement being enabled to be carried out by means of the RCN transmitting a "quiet" message to other nodes in the system, said "quiet" message being a message which prohibits other nodes from transmitting during a certain interval defined in the "quiet" message, which method is characterized in that the RCN recognizes radar signals by means of measuring the duration of pulses received during the "quiet" intervals, so that if a received frame has a duration which is shorter than the shortest duration of a frame of the LAN-system, and has a signal strength above a certain predetermined level, radar is assumed, and if the duration of the frame is longer than the longest assumed duration of a radar frame, LAN is assumed.

7. The method of claim 6, according to which the signal strength of the received pulse is calculated by means of a averaging using a first averaging process for received pulses which have a first predetermined duration, and a second averaging process for received pulses which have a second, shorter, predetermined duration.

8. A method for use in a wireless LAN-system of the 802.11-type for avoiding interference between radar signals and the signals exchanged between a plurality of wireless broadcasting nodes in the system, the method comprising the steps of:

enabling one of the nodes in the system to function as a radar controlling node (RCN) and letting said RCN carry out measurement on at least one frequency in a frequency band which has been assigned to the system, said measurements being carried out to detect if said at least one frequency is being utilized by a device or a system foreign to said wireless communications system, such as a radar device or system, the measurement being enabled to be carried out by means of the RCN transmitting a "quiet" message to other nodes in the system, said "quiet" message being a message which prohibits other nodes from transmitting during a certain interval defined in the "quiet" message, which method is characterized in that:

the transmitting of the "quiet" message is triggered by the RCN detecting that it needs a certain amount of time to carry out its measurement, or by the RCN detecting an event which makes the radar detection too uncertain.

9. The method of claim 8, in which said event comprises the number of detected corrupted LAN frames within a certain time period exceeding a certain pre-defined level.

10. The method of claim 8, in which said event comprises the detection within a pre-defined period of time of an amount of radar pulses which is above a predefined threshold.

11. A method for use in a wireless LAN-system of the 802.11-type for avoiding interference between radar signals and the signals exchanged between a plurality of wireless broadcasting nodes in the system, the method comprising the steps of:

enabling one of the nodes in the system to function as a radar controlling node (RCN) and letting said RCN carry out measurement on at least one frequency in a frequency band which has been assigned to the system, said measurements being carried out to detect if said at least one frequency is being utilized by a device or a system foreign to said wireless-communication-system, such as a radar device or system, characterized in that:

the RCN tracks the whole LAN traffic without actively controlling the traffic, and, at the same time the RCN scans for radar transmissions in time periods without traffic, with said scanning being performed by RSS measurements, which are compared with a predefined radar detection power threshold, and:

if said threshold is not exceeded it is assumed that no radar is present.

if said threshold is exceeded, the RCN checks whether this was due to LAN traffic, and if this is the case, the corresponding LAN traffic duration is excluded from the measurement time.

12. The method of claim 11, further characterized in that if the LAN traffic load is during a desired measurement period exceeds a certain level, or if the received LAN traffic exceeds a predefined radar power threshold more frequently than a certain limit, the RCN starts to control the LAN traffic, in order to ensure that the radar measurements are no longer disturbed by LAN traffic.

13. The method of claim 11, further characterized in that if signals received on a certain frequency cannot be detected as LAN traffic and are above a predefined radar power threshold, the RCN starts to initiate and control that this frequency is no longer used.

14. The method of claim 11, in which the RCN starts to control the traffic to suppress LAN traffic if it notices a certain amount of RSS measurements above a predefined radar power threshold although no LAN traffic is detected, by means of which the RCN can ensure that it does not falsely detect radar due to non-detectable LAN interference.

15. A method for use in a wireless LAN-system of the 802.11-type for avoiding interference between radar signals and the signals exchanged between a plurality of wireless broadcasting nodes in the system, the method comprising the steps of:

enabling one of the nodes in the system to function as a radar controlling node (RCN) and letting said RCN carry out measurement on at least one frequency in a frequency band which has been assigned to the system, said measurements being carried out to detect if said at least one frequency is being utilized by a device or a system foreign to said wireless communications system, such as a radar device or system, characterized in that:

the RCN schedules measurement periods on its current operating channel, as well as on other channels, including channels which have previously been detected as used by radar devices, and keeps track of the total measurement time ($T_{TOT}$), said total measurement time being defined as the sum of all measurement intervals ($T_{meas}$) on a specific channel, and, the variable $T_{TOT}$ is initially set to a predetermined value once radar has been detected on a specific channel, and each time a measurement is made on a channel previously detected as radar-occupied, if radar is detected during a measurement interval, the value of $T_{TOT}$ is unchanged, and if no radar signal is detected during a measurement interval, the total measurement time is increased in a cumulative manner, as $T_{TOT}=T_{TOT}+T_{meas}$, and if $T_{TOT}$ satisfies a given requirement on total measurement time, a previously radar-marked channel can be considered as radar-free, and if radar is detected after a number of radar-free measurements, the cumulative total time $T_{TOT}$ will once again be set to its initial predetermined value.

* * * * *